(12) United States Patent
Roddy et al.

(10) Patent No.: US 8,586,512 B2
(45) Date of Patent: *Nov. 19, 2013

(54) CEMENT COMPOSITIONS AND METHODS UTILIZING NANO-CLAY

(75) Inventors: Craig W. Roddy, Duncan, OK (US); Ricky L. Covington, Duncan, OK (US); Jiten Chatterji, Duncan, OK (US); D. Chad Brenneis, Marlow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/567,782

(22) Filed: Sep. 27, 2009

(65) Prior Publication Data

US 2010/0025039 A1 Feb. 4, 2010

Related U.S. Application Data

(63) Continuation-in-part of application No. 12/263,954, filed on Nov. 3, 2008, which is a continuation-in-part of application No. 11/747,002, filed on May 10, 2007, now Pat. No. 7,559,369.

(51) Int. Cl.
*C09K 8/46* (2006.01)

(52) U.S. Cl.
USPC ......... 507/271; 507/269; 166/293; 423/328.1

(58) Field of Classification Search
None
See application file for complete search history.

(56) References Cited

U.S. PATENT DOCUMENTS

| | | | |
|---|---|---|---|
| 2,094,316 A | 9/1937 | Cross et al. |
| 2,329,940 A | 9/1943 | Ponzer |
| 2,842,205 A | 7/1958 | Allen et al. |
| 2,848,051 A | 8/1958 | Willaims |
| 2,857,286 A | 10/1958 | Striker |
| 2,871,133 A | 1/1959 | Palonen et al. |
| 2,880,096 A | 3/1959 | Hurley |
| 2,890,169 A | 6/1959 | Prokop |
| 2,933,135 A | 4/1960 | Johnson |
| 2,945,769 A | 7/1960 | Gama et al. |
| 2,952,318 A | 9/1960 | Ritch |
| 2,959,223 A | 11/1960 | Harmon et al. |
| 2,978,024 A | 4/1961 | Davis |
| 3,026,938 A | 3/1962 | Huitt et al. |
| 3,168,139 A | 2/1965 | Kennedy et al. |
| 3,219,112 A | 11/1965 | Sauber et al. |
| 3,336,979 A | 8/1967 | Ingraham et al. |
| 3,353,601 A | 11/1967 | Dollarhide et al. |
| 3,366,177 A | 1/1968 | Powers et al. |
| 3,381,748 A | 5/1968 | Peters et al. |
| 3,454,095 A | 7/1969 | Messenger et al. |
| 3,467,193 A | 9/1969 | Messenger |
| 3,499,491 A | 3/1970 | Wyant et al. |
| 3,557,876 A | 1/1971 | Tragesser |
| 3,607,326 A | 9/1971 | Serafin |
| RE27,271 E | 1/1972 | Hamsberger et al. |
| 3,748,159 A | 7/1973 | George |
| 3,854,985 A | 12/1974 | Suzuki et al. |
| 3,876,005 A | 4/1975 | Fincher et al. |
| 3,877,522 A | 4/1975 | Knight et al. |
| 3,887,009 A | 6/1975 | Miller et al. |
| 3,887,385 A | 6/1975 | Quist et al. |
| 3,888,311 A | 6/1975 | Cooke, Jr. |
| 3,958,638 A | 5/1976 | Johnston |
| 4,018,617 A | 4/1977 | Nicholson |
| 4,031,184 A | 6/1977 | McCord |
| 4,036,301 A | 7/1977 | Powers et al. |
| 4,142,910 A | 3/1979 | Kraemer et al. |
| 4,176,720 A | 12/1979 | Wilson |
| 4,202,413 A | 5/1980 | Messenger |
| 4,202,795 A | 5/1980 | Burnham et al. |
| 4,235,291 A | 11/1980 | Messenger |
| 4,268,316 A | 5/1981 | Wills, Jr. |
| 4,274,881 A | 6/1981 | Langton et al. |

(Continued)

FOREIGN PATENT DOCUMENTS

| | | | |
|---|---|---|---|
| CA | 2514492 | 9/2004 |
| CA | 2153372 | 1/2006 | ............. C04B 18/12 |

(Continued)

OTHER PUBLICATIONS

"Effect of the particle size on the micro and nanostructural features of calcium phosphate cement: a kinetic analysis", Biomaterials 25 (2004) 3453-3462.*

(Continued)

*Primary Examiner* — John J Figueroa
(74) *Attorney, Agent, or Firm* — Craig W. Roddy; Tumey L.L.P.

(57) ABSTRACT

The present invention includes well treatment fluids and methods utilizing nano-particles. An embodiment of a method of the present invention may comprise introducing a treatment fluid comprising nano-clay into a subterranean formation. The treatment fluid may be selected from the group consisting of a cement composition, a drilling fluid, a spacer fluid, and a lost circulation control composition. Another embodiment of the present invention may comprise a method of cementing. The method of cementing may comprise introducing a cement composition comprising a hydraulic cement, nano-clay, and water into a subterranean formation. The method further may comprise allowing the cement composition to set in the subterranean formation. Yet another embodiment of the present invention may comprise a treatment fluid, the treatment fluid comprising nano-clay. The treatment fluid may be selected from the group consisting of a cement composition, a drilling fluid, a spacer fluid, and a lost circulation control composition.

37 Claims, No Drawings

(56) References Cited

U.S. PATENT DOCUMENTS

| | | | |
|---|---|---|---|
| 4,284,433 A | 8/1981 | Aignesberger et al. | |
| 4,341,562 A | 7/1982 | Ahlbeck | |
| RE31,190 E | 3/1983 | Detroit et al. | |
| 4,407,677 A | 10/1983 | Wills, Jr. | |
| 4,432,800 A | 2/1984 | Kneller et al. | |
| 4,435,216 A | 3/1984 | Diehl et al. | |
| 4,460,292 A | 7/1984 | Durham et al. | |
| 4,494,990 A | 1/1985 | Harris | |
| 4,506,734 A | 3/1985 | Nolte | |
| 4,515,635 A | 5/1985 | Rao et al. | |
| 4,519,452 A | 5/1985 | Tsao et al. | |
| 4,555,269 A | 11/1985 | Rao et al. | |
| 4,614,599 A | 9/1986 | Walker | |
| 4,624,711 A | 11/1986 | Styron | |
| 4,633,950 A | 1/1987 | Delhommer et al. | |
| 4,643,362 A | 2/1987 | Serafin | |
| 4,650,520 A * | 3/1987 | Johnsen et al. | 106/639 |
| 4,660,642 A | 4/1987 | Young | |
| 4,676,317 A | 6/1987 | Fry et al. | |
| 4,676,832 A | 6/1987 | Childs et al. | |
| 4,700,777 A | 10/1987 | Luers | |
| 4,711,401 A | 12/1987 | Serafin | |
| 4,721,160 A | 1/1988 | Parcevaux et al. | |
| 4,741,401 A | 5/1988 | Walles et al. | |
| 4,741,782 A | 5/1988 | Styron | |
| 4,770,796 A | 9/1988 | Jacobs | |
| 4,784,223 A | 11/1988 | Worrall et al. | |
| 4,848,973 A | 7/1989 | Yokota et al. | |
| 4,883,125 A | 11/1989 | Wilson et al. | |
| 4,941,536 A | 7/1990 | Brothers et al. | |
| 4,953,620 A | 9/1990 | Bloys et al. | |
| 4,961,790 A | 10/1990 | Smith et al. | |
| 4,992,102 A | 2/1991 | Barbour | |
| 5,030,366 A | 7/1991 | Wilson et al. | |
| 5,049,288 A | 9/1991 | Brothers et al. | |
| 5,058,679 A | 10/1991 | Hale et al. | |
| RE33,747 E | 11/1991 | Hartley et al. | |
| 5,086,850 A * | 2/1992 | Harris et al. | 175/61 |
| 5,102,558 A * | 4/1992 | McDougall et al. | 507/260 |
| 5,121,795 A * | 6/1992 | Ewert et al. | 166/292 |
| 5,123,487 A * | 6/1992 | Harris et al. | 166/277 |
| 5,125,455 A * | 6/1992 | Harris et al. | 166/292 |
| 5,127,473 A * | 7/1992 | Harris et al. | 166/277 |
| 5,149,370 A * | 9/1992 | Olaussen et al. | 166/292 |
| 5,151,203 A | 9/1992 | Riley et al. | |
| 5,183,505 A | 2/1993 | Spinney | |
| 5,203,629 A | 4/1993 | Valle et al. | |
| 5,207,832 A | 5/1993 | Baffreau et al. | |
| 5,213,160 A | 5/1993 | Nahm et al. | |
| 5,236,501 A | 8/1993 | Nomachi et al. | |
| 5,238,064 A | 8/1993 | Dahl et al. | |
| 5,253,991 A | 10/1993 | Yokota et al. | |
| 5,263,542 A * | 11/1993 | Brothers | 166/293 |
| 5,266,111 A | 11/1993 | Barbour | |
| 5,292,512 A | 3/1994 | Schaefer et al. | |
| 5,295,543 A | 3/1994 | Terry et al. | |
| 5,305,831 A | 4/1994 | Nahm | |
| 5,314,022 A | 5/1994 | Cowan et al. | |
| 5,320,851 A | 6/1994 | Mars et al. | |
| 5,327,968 A | 7/1994 | Onan et al. | |
| 5,337,824 A | 8/1994 | Cowan | |
| 5,339,903 A | 8/1994 | Eoff et al. | |
| 5,340,397 A | 8/1994 | Brothers | |
| 5,346,012 A * | 9/1994 | Heathman et al. | 166/293 |
| 5,352,288 A | 10/1994 | Mallow | |
| 5,358,044 A | 10/1994 | Hale et al. | |
| 5,358,047 A | 10/1994 | Himes et al. | |
| 5,358,049 A | 10/1994 | Hale et al. | |
| 5,361,841 A | 11/1994 | Hale et al. | |
| 5,361,842 A | 11/1994 | Hale et al. | |
| 5,368,103 A | 11/1994 | Heathman et al. | |
| 5,370,185 A | 12/1994 | Cowan et al. | |
| 5,372,641 A | 12/1994 | Carpenter | |
| 5,373,901 A | 12/1994 | Norman et al. | |
| 5,375,661 A * | 12/1994 | Daneshy et al. | 166/278 |
| 5,382,290 A | 1/1995 | Nahm et al. | |
| 5,383,521 A | 1/1995 | Onan et al. | |
| 5,383,967 A | 1/1995 | Chase | |
| 5,389,706 A * | 2/1995 | Heathman et al. | 166/293 |
| 5,398,758 A | 3/1995 | Onan et al. | |
| 5,398,759 A * | 3/1995 | Rodrigues et al. | 166/293 |
| 5,423,379 A | 6/1995 | Hale et al. | |
| 5,439,056 A | 8/1995 | Cowan | |
| 5,454,867 A | 10/1995 | Brothers et al. | |
| 5,456,751 A | 10/1995 | Zandi et al. | |
| 5,458,195 A | 10/1995 | Totten et al. | |
| 5,464,060 A | 11/1995 | Hale et al. | |
| 5,472,051 A | 12/1995 | Brothers | |
| 5,476,142 A | 12/1995 | Kajita | |
| 5,476,144 A | 12/1995 | Nahm et al. | |
| 5,494,513 A | 2/1996 | Fu et al. | |
| 5,499,677 A | 3/1996 | Cowan | |
| 5,515,921 A | 5/1996 | Cowan et al. | |
| 5,518,996 A | 5/1996 | Maroy | |
| 5,520,730 A | 5/1996 | Barbour | |
| 5,529,624 A | 6/1996 | Riegler | |
| 5,536,311 A | 7/1996 | Rodrigues | |
| 5,542,782 A | 8/1996 | Carter et al. | |
| 5,551,976 A | 9/1996 | Allen | |
| 5,569,324 A | 10/1996 | Totten et al. | |
| 5,575,841 A | 11/1996 | Dry | |
| 5,580,379 A | 12/1996 | Cowan | |
| 5,585,333 A | 12/1996 | Dahl et al. | |
| 5,588,488 A | 12/1996 | Vijn et al. | |
| 5,588,489 A | 12/1996 | Chatterji et al. | |
| 5,603,961 A | 2/1997 | Suzuki et al. | |
| 5,660,624 A | 8/1997 | Dry | |
| 5,663,230 A | 9/1997 | Haman | |
| 5,673,753 A | 10/1997 | Hale et al. | |
| 5,688,844 A | 11/1997 | Chatterji et al. | |
| 5,711,383 A | 1/1998 | Terry et al. | |
| 5,716,910 A | 2/1998 | Totten et al. | |
| 5,728,209 A | 3/1998 | Bury et al. | |
| 5,728,654 A | 3/1998 | Dobson et al. | |
| 5,741,357 A | 4/1998 | Sheikh | |
| 5,766,323 A | 6/1998 | Butler et al. | |
| 5,779,787 A | 7/1998 | Brothers et al. | |
| 5,783,541 A | 7/1998 | Tack et al. | |
| 5,795,060 A | 8/1998 | Stephens | |
| 5,820,670 A | 10/1998 | Chatterji et al. | |
| 5,851,960 A | 12/1998 | Totten et al. | |
| 5,866,516 A | 2/1999 | Costin | |
| 5,874,387 A | 2/1999 | Carpenter et al. | |
| 5,879,699 A | 3/1999 | Lerner | |
| 5,897,699 A | 4/1999 | Chatterji et al. | |
| 5,900,053 A | 5/1999 | Brothers et al. | |
| 5,913,364 A | 6/1999 | Sweatman | |
| 5,988,279 A | 11/1999 | Udarbe et al. | |
| 5,989,334 A | 11/1999 | Dry | |
| 6,022,408 A | 2/2000 | Stokes et al. | |
| 6,027,561 A | 2/2000 | Gruber et al. | |
| 6,060,434 A | 5/2000 | Sweatman et al. | |
| 6,060,535 A | 5/2000 | Villar et al. | |
| 6,063,738 A | 5/2000 | Chatterji et al. | |
| 6,138,759 A | 10/2000 | Chatterji et al. | |
| 6,143,069 A | 11/2000 | Brothers et al. | |
| 6,145,591 A | 11/2000 | Boncan et al. | |
| 6,153,562 A | 11/2000 | Villar et al. | |
| 6,167,967 B1 | 1/2001 | Sweatman | |
| 6,170,575 B1 | 1/2001 | Reddy et al. | |
| 6,230,804 B1 | 5/2001 | Mueller et al. | |
| 6,244,343 B1 | 6/2001 | Brothers et al. | |
| 6,245,142 B1 | 6/2001 | Reddy et al. | |
| 6,258,757 B1 | 7/2001 | Sweatman et al. | |
| 6,261,360 B1 | 7/2001 | Dry | |
| 6,277,189 B1 | 8/2001 | Chugh | |
| 6,279,655 B1 * | 8/2001 | Pafitis et al. | 166/294 |
| 6,312,515 B1 | 11/2001 | Barlet-Gouedard et al. | |
| 6,315,042 B1 | 11/2001 | Griffith et al. | |
| 6,332,921 B1 | 12/2001 | Brothers et al. | |
| 6,367,550 B1 | 4/2002 | Chatterji et al. | |
| 6,379,456 B1 | 4/2002 | Heathman et al. | |
| 6,390,197 B1 * | 5/2002 | Maroy | 166/291 |
| 6,402,833 B1 | 6/2002 | O'Hearn et al. | |

(56) References Cited

U.S. PATENT DOCUMENTS

| | | |
|---|---|---|
| 6,409,819 B1 | 6/2002 | Ko |
| 6,444,316 B1 | 9/2002 | Reddy et al. |
| 6,457,524 B1 | 10/2002 | Roddy |
| 6,471,975 B1 | 10/2002 | Banovetz et al. |
| 6,478,869 B2 | 11/2002 | Reddy et al. |
| 6,488,089 B1 | 12/2002 | Bour et al. |
| 6,488,763 B2 | 12/2002 | Brothers et al. |
| 6,488,764 B2 | 12/2002 | Westerman |
| 6,494,951 B1 | 12/2002 | Reddy et al. |
| 6,500,252 B1 | 12/2002 | Chatterji et al. |
| 6,500,253 B2 | 12/2002 | Norman et al. |
| 6,502,636 B2 | 1/2003 | Chatterji et al. |
| 6,508,305 B1 | 1/2003 | Brannon et al. |
| 6,524,384 B2 | 2/2003 | Griffith et al. |
| 6,527,051 B1 | 3/2003 | Reddy et al. |
| 6,527,849 B2 | 3/2003 | Dry |
| 6,547,871 B2 | 4/2003 | Chatterji et al. |
| 6,547,891 B2 | 4/2003 | Linden et al. |
| 6,554,067 B1 | 4/2003 | Davies et al. |
| 6,554,071 B1 | 4/2003 | Reddy et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 | 6/2003 | Gleeson et al. |
| 6,599,863 B1 | 7/2003 | Palmer et al. |
| 6,610,139 B2 | 8/2003 | Reddy et al. |
| 6,626,243 B1 | 9/2003 | Go Boncan |
| 6,631,766 B2 | 10/2003 | Brothers et al. |
| 6,632,527 B1 | 10/2003 | McDaniel et al. |
| 6,645,288 B1 | 11/2003 | Dargaud et al. |
| 6,645,290 B1 | 11/2003 | Barbour |
| 6,648,962 B2 | 11/2003 | Berke et al. |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,716,282 B2 | 4/2004 | Griffith et al. |
| 6,729,405 B2 | 5/2004 | DiLullo et al. |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,808,561 B2 | 10/2004 | Genge |
| 6,811,603 B2 | 11/2004 | Brothers et al. |
| 6,823,940 B2 | 11/2004 | Reddy et al. |
| 6,832,651 B2 | 12/2004 | Ravi et al. |
| 6,835,243 B2 | 12/2004 | Brothers et al. |
| 6,837,316 B2 | 1/2005 | Reddy et al. |
| 6,840,318 B2 | 1/2005 | Lee |
| 6,846,357 B2 | 1/2005 | Reddy et al. |
| 6,848,519 B2 | 2/2005 | Reddy et al. |
| 6,861,392 B2 | 3/2005 | Shaarpour |
| 6,874,578 B1 * | 4/2005 | Garnier et al. ............... 166/293 |
| 6,883,609 B2 * | 4/2005 | Drochon et al. ............... 166/292 |
| 6,887,833 B2 | 5/2005 | Brothers et al. |
| 6,889,767 B2 | 5/2005 | Reddy et al. |
| 6,902,001 B2 | 6/2005 | Dargaud et al. |
| 6,904,971 B2 | 6/2005 | Brothers et al. |
| 6,907,929 B2 | 6/2005 | LeRoy-Delage et al. |
| 6,908,508 B2 | 6/2005 | Brothers |
| 6,911,078 B2 | 6/2005 | Barlet-Gouedard et al. |
| 6,926,081 B2 | 8/2005 | Sweatman et al. |
| 6,962,201 B2 | 11/2005 | Brothers |
| 7,007,755 B2 | 3/2006 | Reddy et al. |
| 7,022,179 B1 | 4/2006 | Dry |
| 7,026,272 B2 | 4/2006 | Reddy et al. |
| 7,032,664 B2 | 4/2006 | Lord et al. |
| 7,033,975 B2 | 4/2006 | Baran, Jr. et al. |
| 7,048,053 B2 | 5/2006 | Santra et al. |
| 7,059,415 B2 | 6/2006 | Bosma et al. |
| 7,077,203 B1 | 7/2006 | Roddy et al. |
| 7,084,092 B2 | 8/2006 | Patel et al. |
| 7,086,466 B2 | 8/2006 | Roddy |
| 7,138,446 B2 | 11/2006 | Reddy et al. |
| 7,143,828 B2 | 12/2006 | Reddy et al. |
| 7,143,832 B2 | 12/2006 | Freyer |
| 7,156,173 B2 | 1/2007 | Mueller |
| 7,156,174 B2 | 1/2007 | Roddy et al. |
| 7,172,022 B2 | 2/2007 | Reddy et al. |
| 7,174,962 B1 | 2/2007 | Roddy et al. |
| 7,199,086 B1 | 4/2007 | Roddy et al. |
| 7,204,307 B2 | 4/2007 | Roddy et al. |
| 7,204,310 B1 | 4/2007 | Roddy et al. |
| 7,204,312 B2 | 4/2007 | Roddy et al. |
| 7,213,646 B2 | 5/2007 | Roddy et al. |
| 7,264,053 B2 | 9/2007 | Vargo, Jr. et al. |
| 7,279,447 B2 | 10/2007 | Lal et al. |
| 7,284,609 B2 | 10/2007 | Roddy et al. |
| 7,284,611 B2 | 10/2007 | Reddy et al. |
| 7,294,194 B2 | 11/2007 | Reddy et al. |
| 7,296,597 B1 | 11/2007 | Freyer et al. |
| 7,303,014 B2 | 12/2007 | Reddy et al. |
| 7,335,252 B2 | 2/2008 | Roddy et al. |
| 7,337,841 B2 | 3/2008 | Ravi |
| 7,337,842 B2 | 3/2008 | Roddy et al. |
| 7,338,923 B2 | 3/2008 | Roddy et al. |
| 7,341,104 B2 | 3/2008 | Roddy et al. |
| 7,351,279 B2 | 4/2008 | Brothers |
| 7,353,870 B2 | 4/2008 | Roddy et al. |
| 7,381,263 B2 | 6/2008 | Roddy et al. |
| 7,387,675 B2 | 6/2008 | Roddy et al. |
| 7,393,407 B2 | 7/2008 | Dingsoyr et al. |
| 7,395,860 B2 | 7/2008 | Roddy et al. |
| 7,404,440 B2 | 7/2008 | Reddy et al. |
| 7,409,991 B2 | 8/2008 | Reddy et al. |
| 7,422,060 B2 | 9/2008 | Hammami et al. |
| 7,424,913 B2 | 9/2008 | Roddy |
| 7,445,668 B2 | 11/2008 | Sommain |
| 7,445,669 B2 | 11/2008 | Roddy et al. |
| 7,451,817 B2 | 11/2008 | Reddy et al. |
| 7,461,696 B2 | 12/2008 | Nguyen et al. |
| 7,478,675 B2 | 1/2009 | Roddy et al. |
| 7,482,309 B2 | 1/2009 | Ravi et al. |
| 7,559,369 B2 * | 7/2009 | Roddy et al. ............... 166/280.2 |
| 7,784,542 B2 | 8/2010 | Roddy |
| 7,806,183 B2 | 10/2010 | Roddy et al. |
| 7,846,876 B2 | 12/2010 | Koyanagi |
| 8,114,820 B2 | 2/2012 | Crews |
| 8,226,879 B2 | 7/2012 | Genolet et al. |
| 8,476,203 B2 | 7/2013 | Patil et al. |
| 8,499,837 B2 | 8/2013 | Koons |
| 2002/0004464 A1 | 1/2002 | Nelson et al. |
| 2002/0033121 A1 | 3/2002 | Marko |
| 2002/0073894 A1 | 6/2002 | Genge et al. |
| 2002/0073897 A1 | 6/2002 | Trato |
| 2002/0117090 A1 | 8/2002 | Ku |
| 2002/0193257 A1 | 12/2002 | Lee et al. |
| 2003/0089281 A1 | 5/2003 | Berke et al. |
| 2003/0116065 A1 | 6/2003 | Griffith et al. |
| 2003/0116887 A1 | 6/2003 | Scott |
| 2003/0134751 A1 | 7/2003 | Lee et al. |
| 2003/0167970 A1 | 9/2003 | Polston |
| 2003/0168215 A1 * | 9/2003 | Drochon et al. ............... 166/276 |
| 2003/0220204 A1 | 11/2003 | Baran et al. |
| 2003/0234103 A1 * | 12/2003 | Lee et al. ............... 166/293 |
| 2004/0007162 A1 | 1/2004 | Morioka et al. |
| 2004/0040475 A1 | 3/2004 | De La Roij et al. |
| 2004/0055748 A1 | 3/2004 | Reddy et al. |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0121916 A1 | 6/2004 | Kono |
| 2004/0144537 A1 | 7/2004 | Reddy et al. |
| 2004/0171499 A1 | 9/2004 | Ravi et al. |
| 2004/0187740 A1 | 9/2004 | Timmons |
| 2004/0188091 A1 | 9/2004 | Luke et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |

(56) References Cited

U.S. PATENT DOCUMENTS

| | | |
|---|---|---|
| 2004/0244977 A1 | 12/2004 | Luke et al. |
| 2004/0256102 A1 | 12/2004 | Trato |
| 2004/0261990 A1 | 12/2004 | Bosma et al. |
| 2004/0261999 A1 | 12/2004 | Nguyen |
| 2005/0000734 A1 | 1/2005 | Getzlaf et al. |
| 2005/0022991 A1 | 2/2005 | Rao |
| 2005/0034867 A1 | 2/2005 | Griffith et al. |
| 2005/0049150 A1* | 3/2005 | Patel et al. ............... 507/136 |
| 2005/0056191 A1 | 3/2005 | Brothers et al. |
| 2005/0061206 A1 | 3/2005 | Reddy et al. |
| 2005/0072599 A1 | 4/2005 | Luke et al. |
| 2005/0084334 A1 | 4/2005 | Shi et al. |
| 2005/0096207 A1 | 5/2005 | Urbanek |
| 2005/0098317 A1 | 5/2005 | Reddy et al. |
| 2005/0113260 A1 | 5/2005 | Wood |
| 2005/0113262 A1 | 5/2005 | Ravi et al. |
| 2005/0133221 A1 | 6/2005 | Chatterji et al. |
| 2005/0173117 A1 | 8/2005 | Roddy |
| 2005/0199401 A1 | 9/2005 | Patel et al. |
| 2006/0016598 A1 | 1/2006 | Urbanek |
| 2006/0025312 A1 | 2/2006 | Santra et al. |
| 2006/0054319 A1* | 3/2006 | Fyten et al. ............... 166/292 |
| 2006/0086503 A1 | 4/2006 | Reddy et al. |
| 2006/0089851 A1 | 4/2006 | Silby et al. |
| 2006/0122071 A1 | 6/2006 | Reddy et al. |
| 2006/0162926 A1 | 7/2006 | Roddy |
| 2006/0166834 A1 | 7/2006 | Roddy |
| 2006/0177661 A1 | 8/2006 | Smith et al. |
| 2006/0260512 A1 | 11/2006 | Nordmeyer |
| 2006/0260513 A1 | 11/2006 | Porro Guiterrez et al. |
| 2006/0278131 A1 | 12/2006 | Hunt |
| 2007/0012436 A1 | 1/2007 | Freyer |
| 2007/0015668 A1 | 1/2007 | Harrower et al. |
| 2007/0017676 A1 | 1/2007 | Reddy et al. |
| 2007/0056475 A1 | 3/2007 | Roddy et al. |
| 2007/0056479 A1 | 3/2007 | Gray |
| 2007/0056732 A1 | 3/2007 | Roddy et al. |
| 2007/0056733 A1 | 3/2007 | Roddy et al. |
| 2007/0062691 A1 | 3/2007 | Reddy et al. |
| 2007/0102157 A1 | 5/2007 | Rodldy et al. |
| 2007/0125534 A1 | 6/2007 | Reddy et al. |
| 2007/0137528 A1 | 6/2007 | LeRoy-Deluge et al. |
| 2007/0151484 A1 | 7/2007 | Reddy et al. |
| 2007/0151724 A1 | 7/2007 | Ohmer et al. |
| 2007/0151730 A1 | 7/2007 | Reddy et al. |
| 2007/0186820 A1 | 8/2007 | O'Hearn |
| 2007/0204765 A1 | 9/2007 | LeRoy-Deluge et al. |
| 2007/0227734 A1 | 10/2007 | Freyer |
| 2007/0246225 A1 | 10/2007 | Hailey, Jr. et al. |
| 2007/0255457 A1 | 11/2007 | Whitcomb et al. |
| 2008/0017376 A1 | 1/2008 | Badalamenti et al. |
| 2008/0058229 A1 | 3/2008 | Berkland et al. |
| 2008/0099203 A1 | 5/2008 | Mueller et al. |
| 2008/0108524 A1 | 5/2008 | Willberg et al. |
| 2008/0135250 A1 | 6/2008 | Bosma et al. |
| 2008/0156491 A1 | 7/2008 | Roddy et al. |
| 2008/0261027 A1 | 10/2008 | Li et al. |
| 2008/0261834 A1 | 10/2008 | Simon |
| 2008/0277116 A1 | 11/2008 | Roddy et al. |
| 2009/0088348 A1 | 4/2009 | Roddy |
| 2009/0114126 A1 | 5/2009 | Roddy |
| 2009/0120644 A1 | 5/2009 | Roddy |
| 2009/0124522 A1 | 5/2009 | Roddy |
| 2009/0139719 A1 | 6/2009 | Luo |
| 2009/0200029 A1 | 8/2009 | Roddy et al. |
| 2009/0236097 A1* | 9/2009 | Roddy et al. ............... 166/293 |
| 2009/0260544 A1 | 10/2009 | Roddy |
| 2010/0016183 A1 | 1/2010 | Roddy et al. |
| 2010/0075874 A1 | 3/2010 | Perera Mercado et al. |
| 2010/0095871 A1 | 4/2010 | Patil et al. |
| 2010/0096135 A1 | 4/2010 | Roddy et al. |
| 2011/0162845 A1 | 7/2011 | Ravi et al. |
| 2011/0237467 A1 | 9/2011 | Cornette |
| 2011/0312857 A1 | 12/2011 | Amanullah |

FOREIGN PATENT DOCUMENTS

| | | | |
|---|---|---|---|
| CN | 101544488 | 9/2009 | |
| DE | 102007042078 | 3/2009 | |
| EP | 0748782 | 12/1996 | |
| EP | 0814067 | 12/1997 | ............ C04B 28/06 |
| EP | 1236701 | 9/2002 | ............ C04B 28/04 |
| EP | 1394137 | 7/2003 | ............ C04B 38/08 |
| EP | 1348831 | 10/2003 | ............ E21B 33/13 |
| EP | 1686234 A1 | 8/2006 | |
| EP | 1719741 A1 | 11/2006 | |
| EP | 2465910 A1 | 11/2009 | |
| FR | 2787105 | 6/2000 | |
| GB | 1469954 | 4/1997 | ............ C04B 24/36 |
| GB | 2429725 | 3/2007 | |
| JP | 52117316 | 10/1977 | ............ C04B 13/02 |
| JP | 10110487 | 4/1998 | ............ E04B 1/78 |
| SU | 1373781 | 2/1988 | ............ E04G 21/12 |
| WO | WO 83/01443 | 4/1983 | ............ C04B 7/14 |
| WO | 90/11977 | 4/1990 | |
| WO | 9011977 | 10/1990 | |
| WO | WO 97/05079 | 2/1997 | |
| WO | WO 97/49644 | 12/1997 | |
| WO | WO 98/54108 | 12/1998 | ............ C04B 28/02 |
| WO | WO 00/63134 | 1/2000 | ............ C04B 28/02 |
| WO | 00/34199 | 6/2000 | |
| WO | WO 00/49272 | 8/2000 | |
| WO | WO 0050357 A1 * | 8/2000 | |
| WO | WO 03/008756 | 7/2001 | |
| WO | WO 0187796 A1 * | 11/2001 | |
| WO | WO 03/031364 | 4/2003 | ............ C04B 18/06 |
| WO | WO 2004/001188 | 12/2003 | |
| WO | WO 2004/057715 | 7/2004 | |
| WO | WO 2004/101951 | 11/2004 | |
| WO | WO 2004/101952 | 11/2004 | |
| WO | WO 2005/047212 | 5/2005 | ............ C04B 38/10 |
| WO | WO 2005/061846 | 7/2005 | ............ E21B 33/13 |
| WO | WO 2005/080287 | 8/2005 | |
| WO | WO 2006/053896 | 11/2005 | |
| WO | WO 2006/032841 | 3/2006 | |
| WO | 2008034461 | 3/2008 | |
| WO | WO 2008/034461 | 3/2008 | |
| WO | WO 2009030758 | 3/2009 | |

OTHER PUBLICATIONS

USPTO Notice of Allowance from U.S. Appl. No. 12/426,393, dated Dec. 16, 2010.

"Effect of Nano-SiO2 on heat of hydration of portland cement," Xu et al., Nanjing Gongye Daxue Xuebao, Ziran Kexeuban (2007), 29(4), 45-48, abstract only.

"Application of nanometer silica in inorganic nonmetallic materials," Deng et al., Taoci (Xiangyang China) 2007, (9), 8-12, abstract only.

"Reaction mechanism analyses of cement based composite materials modified by nano-silica," Xu et al., Kuangye Gongcheng (Changsha, China), 2007, 27(3), 99-102, abstract only.

"Research on Reinforcement of cement composites and relevant mechanism," Yu et al., Qiangdoa Keji Daxue Xuebao, Ziran Kexueban (2006), 27(2), 148-151, abstract only.

"Antagonistic Effect of superplasticizer and colloidal nanosilica in the hydration of Alite and Belite pastes," Bjoernstrom et al., Journal of Materials Science, 2007, 42(11), 3901-3907, abstract only.

"Nano-concrete: possibilities and challenges," Balaguru et al., RILEM Proceedings (2005), PRO 45 (2nd Int'l Symposium on Nanotechnology in construction (NICOM2), 2005, 233-243, abstract only.

"A comparative study on the pozzolanic activity between nano-SiO2 and silica fume," Ye et al., Journal of Wuhan Univ of Technology, Mat'ls Science Edition (2006), 21(3), 153-157, abstract only.

"Optimization of silica fume, fly ash and amorphous nano-silica in superplasticized high-performance concrete," Collepardi et al., American Concrete Institute, SP 2004, SP-221 (Eight CANMET/ACI International Conference on Fly Ash, Silica Fume, Slag, and Natrural Pozzolans in Concrete, 2004), 495-505, abstract only.

"Accelerating effects of colloidal nano-silica for beneficial calcium-silicate-hydrate formation in cement," Bjornstrom et al., Chemical Physics Letters (2004), 392 (1-3), 242-248, abstract only.

(56) References Cited

OTHER PUBLICATIONS

"Experimental study on cement-based composites with nano-SiO2," Feng et al., Cailiao Kexue Yu Gongcheng Zuebao Bianjibu (2004), 22(2), 224-227.
"Strong and bioactive composites containing nano-silica-fused whiskers for bone repair," Xu et al., Biomaterials (2004), 25(19), 4615-4626, abstract only.
Research on properties of Portland cement added with nano-SiO2, Wang et al., RILEM Proceedings (2003), PRO 32 (International Conference on Advances in Concrete and Structures, 2003, vol. 1), 154-161, abstract only.
"Comparison on properties of high strength concrete with nano-SiO2 and silica fume added," Ye et al., Jianzhu Cailiao Xuebao (2003), 6(4), 381-385, abstract only.
"Study on compound effect of silica fume and nano-SiOx for cementing composite materials," Tang et al., Guisuanyan Xuebao (2003), 3(5), 523-527, abstract only.
"Effect of nano-SiOx and silica fume on cement paste water demand," Li et al., Shenyang Jianzhu gongcheng Xueyuan Xuebao, Ziran Kexueban (2002), 18(4), 278-281, abstract only.
"Hydration reaction between C3S and fly ash, silica fume, nano-SiO2, and microstructure of hydrated pastes," Ba et al., Guisuanyan Xuebao (2002), 30(6), 780-784, abstract only.
"Nano-silica—An additive for high-strength concrete," Wagner et al., Wissenschaftliche Zeitschrift—Hoschule fuer Architektur und Bauwesen Weimar—Universitaet (1994), 40 (5/6/7), 183-87, abstract only.
"Investigations on the preparation and mechanical properties of the nano-alumina reinforced cement composite," Li et al., Materials Letters (2006), 0(3), 356-359, abstract only.
"Effect of secondary interface microstructure on pore structure and performance of cement-based materials," Feng et al., Cailiao Yanjiu Xuebao (2003), 17(5), 489-494, abstract only.
"Preparation of multifunctional dry-power paints," Yanmin Gao, Faming Zhuanli Shenqing gongkai Shuomingshu, 4 pages, 2005, abstract only.
USPTO office action from U.S. Appl. No. 12/426,393, dated Jul. 2, 2010.
USPTO notice of allowance from U.S. Appl. No. 12/472,561, dated Jun. 29, 2010.
PCT International Searching Authority for International Application No. PCT/GB2009/002596 dated Feb. 8, 2010.
USPTO Office Action for U.S. Appl. No. 12/833,189 dated Oct. 1, 2010.
PCT International Search Report for International Application No. PCT/GB2010/001806, dated Jan. 20, 2011.
PCT Written Opinion for International Application No. PCT/GB2010/001806, dated Jan. 20, 2011.
English language abstract of CN 101544488, published Sep. 30, 2009.
Office Action from U.S. Appl. No. 12/426,645, dated May 5, 2010.
Office Action from U.S. Appl. No. 12/472,561, dated May 5, 2010.
PCT International Search Report and Written Opinion for International Application No. PCT/GB2010/000485 dated May 21, 2010.
USPTO Office Action for U.S. Appl. No. 12/833,189 dated Feb. 17, 2011.
International Search Report for PCT/GB/2010/001045 dated Jul. 21, 2010.
Written Opinion of the International Searching Authority for PCT/GB/2010/001045 dated Jul. 21, 2010.
U.S. Appl. No. 12/426,645, filed Apr. 20, 2009, Roddy.
Bartlet-Gouedard, "A Non-Conventional Way of Developing Cement Slurry for Geothermal Wells", 2001.
Poon, "A Study of the Hydration of Natural Zeolite Blended Cement Pastes", 1999.
"Beneficial use of Solid Waste in Maine", Apr. 14, 2005.
Smith, "Cementing" Society of Petroleum Engineers, p. 38, 1990.
Smith, "Cementing" Society of Professional Engineers, pp. 14, 38, 1987.
Chan, Comparative Study of the Initial Surface Absorption and Chloride Diffusion of High Performance Zeolite Silica Fume and PFA concretes, 1999.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.
Ding, "Extreme Vertices Design of Concrete With Combined Mineral Admixtures", 1999.
"Kiln Dusts", Apr. 14, 2005.
Sersale, "Portland-Zeolite-Cement for Minimizing Alkali-Aggregate Expansion", 1987.
"Standards for the Management of Cement Kiln Dust Waste", Apr. 14, 2005.
Naiqian, "Study on the Suppression Effect of Natural Zeolite on Expansion of Concrete Due to Alkali-Aggregate Reaction", 1998.
Janotka, "The Properties of Mortar Using Blends With Portland Cement Clinker, Zeolite Tuff and Gypsum", 1995.
Herndon, "Setting Downhole Plugs: A State-of-the-Art, Petroleum Engineer International", Apr. 1978.
Sugama, "Carbonation of Hydrothermally Treated Phosphate-Bonded Calcium Aluminate Cements", pp. 1-9 (undated but admitted as prior art).
Sugama, "Hot Alkali Carbonation of Sodium Metaphosphate Modified Fly Ash/Calcium Aluminate Blend Hydrothermal Cements", pp. 1661-1672, Sep. 11, 1996.
"Use of Cement Kiln Dust for the Stabilization of Soils", R. L. Parsons, et al., Apr. 14, 2005.
Feng, "Zeolite Ceramiste Cellular Concrete", 2000.
Marfil, "Zeolite Crystallization in Portland Cement Concrete Due to Alkali-Aggregate Reaction", 1993.
Atkins, "Zeolite P in Cements", "Its Potential for Immobilizing Toxic and Radioactive Waste Species", 1995.
HES Brochure "AQF-2 Foaming Agent", 1999.
HES Brochure "Halad-23 Fluid Loss Additive", 2000.
HES Brochure "Halad-344 Fluid Loss Additive", 1998.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder" dated 1999.
HES Brochure "HR-4 Cement Retarder", 1999.
HES Brochure HR-5 Cement Additive, 1998.
HES Brochure "HR-7 Cement Retarder", 1999.
HES Brochure "Pozmix A Cement Additive", 1999.
HES Brochure "Pozmix Cement and Pozmix 140".
HES Brochure "SCR-100 Cement Retarder a Valuable Time Saver", 1994.
HES Brochure "SCR-100 Cement Retarder", 1999.
HES Brochure "SCR-500L High Temp Retarder", 2000.
HES Brochure "ThermaLock™ Cement for Corrosive $CO_2$ Environments", 1999.
"3M Scotchlite, Glass Bubbles Floated Product Series Product Information", 1999.
"API Specification for Materials and Testing for Well Cements", API Spec. 10, 5th ed., pp. 7, 19-21, Jul. 1, 1980.
"Appendix A", API RP 13B-2, 2d ed.; pp. 6-8, Dec. 1, 1991.
LaFarge brochure "TerraCem™", Aug. 2006.
LaFarge MSDS "Cement Kiln Dust" Mar. 3, 2005.
LaFarge MSDS "LaFarge Blended Cement (cement)", Mar. 3, 2005.
TXI Material Safety Data Sheet for Pressur-Seal, Oct. 2003.
"Manufacture of supplementary cementitious materials from cement kiln dust", Mishulovich et al., World Cement Research and Development, p. 116-120, Mar. 1996.
"Alkali-activated binders by use of industrial by-products", Buchwald et al., Cement and concrete Research 35, p. 968-793, 2005.
Answer 13 of 24 Chemical Abstracts on STN "Manufacture of ceramic particles from floatstone and fly ash", CN 1182062 (abstract only).
Answer 3 of 24 Chemical Abstracts on STN "Effect of cement kiln dust substitution on chemical and physical properties and compressive strength of Portland and slag cements", Adb El-aleem et al. (abstract only), 2005.

(56) References Cited

OTHER PUBLICATIONS

Office Action from U.S. Appl. No. 11/223,671, Dec. 15, 2005.
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431, (Advisory Action), Jul. 11, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug. 21, 2006.
Office Action from U.S. Appl. No. 11/402,741, Oct. 19, 2006.
Office Action from U.S. Appl. No. 11/484,951, Oct. 26, 2006.
Office Action from U.S. Appl. No. 11/484,951, Dec. 21, 2006.
Office Action from U.S. Appl. No. 11/223,703, Jan. 17, 2007.
Office Action from U.S. Appl. No. 11/402,741, Feb. 2, 2007.
Office Action from U.S. Appl. No. 11/223,485, Feb. 28, 2007.
Office Action from U.S. Appl. No. 11/223,669, Feb. 28, 2007.
Office Action from U.S. Appl. No. 11/271,690, Mar. 13, 2007.
Office Action from U.S. Appl. No. 11/402,741, Mar. 22, 2007.
Office Action from U.S. Appl. No. 11/223,703, Apr. 25, 2007.
Office Action from U.S. Appl. No. 11/402,741, May 29, 2007.
Office Action from U.S. Appl. No. 11/223,669, Jun. 18, 2007.
Office Action from U.S. Appl. No. 11/416,754 (Notice of Allowance), Jul. 2, 2007.
Office Action from U.S. Appl. No. 11/223,485 (Notice of Allowance), Aug. 3, 2007.
Office Action from U.S. Appl. No. 11/257,261, Aug. 10, 2007.
Office Action from U.S. Appl. No. 11/271,690 (Notice of Allowance), Aug. 13, 2007.
Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Office Action from U.S. Appl. No. 11/416,754 (Notice of Allowance), Oct. 17, 2007.
Office Action from U.S. Appl. No. 11/257,261 (Notice of Allowance), Oct. 23, 2007.
Office Action from U.S. Appl. No. 11/402,741, Oct. 24, 2007.
Office Action from U.S. Appl. No. 11/223,750 (Notice of Allowance), Dec. 11, 2007.
Office Action from U.S. Appl. No. 11/402,741 (Notice of Allowance), Dec. 13, 2007.
Office Action from U.S. Appl. No. 11/223,669, Oct. 29, 2008.
Office Action from U.S. Appl. No. 11/256,824 (Notice of Allowance), Feb. 27, 2008.
Office Action from U.S. Appl. No. 11/223,703 (Notice of Allowance), Feb. 27, 2008.
Office Action from U.S. Appl. No. 11/223,669, Apr. 8, 2008.
Office Action from U.S. Appl. No. 11/223,669 (Notice of Allowance), Jun. 30, 2008.
Foreign Search Report from a Related Application, Sep. 9, 2005.
Foreign Search Report from a Related Application, Jul. 5, 2006.
Foreign Search Report from a Related Application, Oct. 27, 2006.
Foreign Search Report from a Related Application, Nov. 2, 2006.
Foreign Search Report from a Related Application, Dec. 1, 2006.
Foreign Search Report from a Related Application, Dec. 19, 2006.
Foreign Search Report from a Related Application, May 8, 2007.
Office Action from U.S. Appl. No. 12/034,886 (Notice of Allowance), Oct. 21, 2008.
Harris et al., "Successful Remedial Operations Using Ultrafine Cement", SPE 24294, 1992.
Heathman et al., "Case Histories Regarding the Application of Microfine Cements", Cementing Technical Paper SPE 23926, 1992.
Halliburton brochure entitled "Micro Matrix Cement", Nov. 2006.
Dalrymple et al., "A Selective Water Control Process", SPE 24330, 1992.
Halim et al., "Preparation of an ultra fast binding cement from calcium silicate-based mixed oxide nanoparticles", Nanotechnology 18, 2007.
Epik Energy brochure entitled "Nanocement".
Nanocor brochure entitled "Nanoclay Structure", Jun. 24, 2008.
He et al., "Chloride Permeability and Microstructure of Portland Cement Mortars Incorporating Nanomaterials", Abstract, Transportation Research Board Annual Meeting 2007 Paper #08-1041, 2008.
Chang et al., "Material Properties of Portland Cement Paste with Nano-Montmorillonite," J. Material Science, May 18, 2007.
Foreign communication from a related counterpart application, Jul. 5, 2005.
Office Action from U.S. Appl. No. 10/775,348, Nov. 23, 2005.
Office Action from U.S. Appl. No. 10/775,348, May 2, 2006.
Notice of Allowance from U.S. Appl. No. 10/775,348, Jun. 6, 2006.
Foreign communication from a related counterpart application, Jun. 29, 2007.
Notice of Allowance from U.S. Appl. No. 11/388,644, Jan. 3, 2008.
Office Action from U.S. Appl. No. 12/008,923, May 20, 2008.
Notice of Allowance from U.S. Appl. No. 12/008,923, Jul. 22, 2008.
Office Action from U.S. Appl. No. 11/388,645, Apr. 3, 2009.
Office Action from U.S. Appl. No. 11/388,645, Jul. 30, 2009.
Nanocor Technical brochure entitled "Nanoclay Structures", Mar. 18, 2009.
Nanofil SE 3000, "Active nanofiller for polymr applications", Product Bulletin/Nanofil, Southern Clay Products.
Halliburton brochure entitled, "Cementing WellLife III Cementing Service", Apr. 2008.
Darbe, "Slurry Design Considerations for Mechanically Enhanced Cement Systems", AADE-08-DF-HO-06, 2008.
Halamickova, "Water Permeability and Chloride Ion Diffusion in Portland Cement Mortars: Relationship to Sand Content and Critical Pore Diameter", Cement and Concrete Research, vol. 25, No. 4, pp. 790-802, 1995.
Montmorillonite, Wikipedia encyclopedia, 2009.
Ravi, "Interventionless Zonal Isolation", Cementing, May 2008.
Schlumberger brochure, "Futur Active set-cement technology for long-term zonal isolation", 2007.
Halliburton brochure, "WellLife III Cementing Service for CO2 Environments", Jun. 2009.
Hunter, "Three Key Mechanisms Deliver Zonal Isolation", IADC.
Office Action from U.S. Appl. No. 11/747,002, Apr. 2, 2008.
Office Action from U.S. Appl. No. 11/747,002, May 27, 2008.
Office Action from U.S. Appl. No. 11/747,002, Jul. 10, 2008.
Office Action from U.S. Appl. No. 11/747,002, Mar. 3, 2009.
USPTO Office Action for U.S. Appl. No. 11/388,645 dated Aug. 17, 2010.
USPTO Office Action for U.S. Appl. No. 12/833,189 dated Nov. 10, 2010.
U.S. Appl. No. 13/052,471, filed Mar. 21, 2011, Ravi et al.
USPTO Office Action for U.S. Appl. No. 12/651,662 dated Apr. 5, 2011.
USPTO Office Action for U.S. Appl. No. 12/567,783 dated Apr. 6, 2011.
USPTO Office Action for U.S. Appl. No. 12/263,954 dated Apr. 20, 2011.
USPTO Office Action for U.S. Appl. No. 12/651,662 dated Apr. 22, 2011.
USPTO Office Action for U.S. Appl. No. 12/833,189 dated May 16, 2011.
Campillo et al., "Improvement of initial mechanical strength by nanoalumina in belite cements", Science Direct, Materials Letters 61, pp. 1889-1892, 2007.
PCT International Search Report and Written Opinion for International Application No. PCT/GB2011/000003 dated Apr. 18, 2011.
USPTO Office Action for U.S. Appl. No. 12/833,189 dated Jul. 18, 2011.
USPTO Office Action for U.S. Appl. No. 12/833,189 dated Feb. 7, 2012.
HES Brochure "Latex 2000", Aug. 2006.
USPTO Office Action for U.S. Appl. No. 12/833,189 dated Oct. 11, 2011.
USPTO Office Action for U.S. Appl. No. 12/263,954 dated Aug. 8, 2011.
USPTO Office Action for U.S. Appl. No. 12/567,783 dated Aug. 23, 2011.

(56) References Cited

OTHER PUBLICATIONS

USPTO Office Action for U.S. Appl. No. 12/651,662 dated Nov. 28, 2011.
USPTO Office Action for U.S. Appl. No. 13/052,471 dated Mar. 6, 2012.
USPTO Office Action for U.S. Appl. No. 12/651,662 dated Mar. 14, 2012.
International Search Report for PCT/GB2010/001805 dated Mar. 31, 2011.
Written Opinion for PCT/GB2010/001805 dated Mar. 27, 2012.
USPTO Office Action for U.S. Appl. No. 13/431,701 dated Nov. 9, 2012.
USPTO Office Action for U.S. Appl. No. 12/651,662 dated Aug. 2, 2012.
USPTO Office Action for U.S. Appl. No. 13/052,471 dated Jun. 28, 2012.
Written Opinion of the International Searching Authority for PCT/GB/2010/000485 dated Oct. 25, 2011.
Written Opinion of the International Searching Authority for PCT/GB/2011/000003 dated Jul. 12, 2012.
Communication from EPO for EPO App. No. 12159772.8 dated May 3, 2012.
Li et al., "Investigations on the preparation and mechanical properties of the nano-alumina reinforced cement composite", Science Direct, Materials Letters 60, pp. 356-359, 2006.
Office Action from U.S. Appl. No. 13/458,112 dated Mar. 15, 2013.
Office Action from U.S. Appl. No. 13/435,701 dated Feb. 19, 2013.
Office Action from U.S. Appl. No. 12/651,662 dated Feb. 13, 2013.
Office Action from U.S. Appl. No. 12/833,189 dated Feb. 6, 2013.
Office Action from U.S. Appl. No. 13/443,934 dated Mar. 4, 2013.
International Search Report and Written Opinion for PCT/GB2010/0010445 dated Jul. 21, 2010.
Office Action from U.S. Appl. No. 13/052,471 dated Feb. 4, 2013.
Office Action from U.S. Appl. No. 12/263,954 dated Mar. 14, 2013.
International Preliminary Report and Written Opinion for PCT/GB2009/002596 dated May 3, 2011.
Final Office Action for U.S. Appl. No. 12/833,189 dated May 28, 2013.
Final Office Action for U.S. Appl. No. 13/435,701 dated Jun. 4, 2013.
Office Action for U.S. Appl. No. 13/443,934 dated Jun. 27, 2013.
Final Office Action for U.S. Appl. No. 13/052,471 dated May 10, 2013.
Office Action for U.S. Appl. No. 13/431,701 dated Jul. 11, 2013.
Search report and Written Opinion for PCT/US2013/038343 dated Jul. 31, 2013.
Andrew R. Barron, Chemical composition of Portland Cement, viewed on Aug. 26, 2013, last edited by author on Jan. 4, 2010.
International Preliminary Report and Written Opinion of PCT/GB2010/001806 dated Mar. 27, 2012.

* cited by examiner

CEMENT COMPOSITIONS AND METHODS UTILIZING NANO-CLAY

CROSS-REFERENCE TO RELATED APPLICATIONS

The present application is a continuation-in-part of U.S. patent application Ser. No. 12/263,954, filed Nov. 3, 2008, entitled "Cement Compositions and Methods Utilizing Nano-Hydraulic Cement," which is a continuation-in-part of U.S. patent application Ser. No. 11/747,002, now U.S. Pat. No. 7,559,369, filed on May 10, 2007, entitled "Well Treatment Compositions and Methods Utilizing Nano-Particles." The entire disclosures of these applications are incorporated herein by reference.

BACKGROUND

The present invention relates to well treatment fluids and methods utilizing nano-particles and, in certain embodiments, to well cement compositions and methods utilizing nano-clay.

In general, well treatments include a wide variety of methods that may be performed in oil, gas, geothermal and/or water wells, such as drilling, completion and workover methods. The drilling, completion and workover methods may include, but are not limited to, drilling, cementing, spacers, and lost circulation control methods. Many of these well treatments are designed to enhance and/or facilitate the recovery of desirable fluids (e.g., hydrocarbons) from a subterranean well.

In cementing methods, such as well construction and remedial cementing, well cement compositions are commonly utilized. For example, in subterranean well construction, a pipe string (e.g., casing and liners) may be run into a well bore and cemented in place using a cement composition. The process of cementing the pipe string in place is commonly referred to as "primary cementing." In a typical primary cementing method, a cement composition may be pumped into an annulus between the walls of the well bore and the exterior surface of the pipe string disposed therein. The cement composition sets in the annular space, thereby forming an annular sheath of hardened, substantially impermeable cement that supports and positions the pipe string in the well bore and bonds the exterior surface of the pipe string to the subterranean formation. Among other things, the annular sheath of set cement surrounding the pipe string functions to prevent the migration of fluids in the annulus, as well as protecting the pipe string from corrosion. Cement compositions also may be used in remedial cementing methods, such as squeeze cementing, repairing casing strings and the placement of cement plugs. In some instances, cement compositions may be used to change the direction of the well bore, for example, by drilling a pilot hole in a hardened mass of cement, commonly referred to as a "kickoff plug," placed in the well bore.

In operation, the annular sheath of cement formed between the well bore and the pipe string in primary cementing may suffer structural failure due to pipe movements which cause shear stresses to be exerted on the set cement. Such stress conditions are commonly the result of relatively high fluid pressures and/or temperatures inside the cemented pipe string during testing, perforating, fluid injection or fluid production. For example, such stress may occur in wells subjected to steam recovery or production of hot formation fluids from high-temperature formations. The high-internal pipe pressure and/or temperature can result in the expansion of the pipe string, both radially and longitudinally, which places stresses on the cement sheath causing the cement bond between the exterior surfaces of the pipe or the well bore walls, or both, to fail and thus allow leakage of formation fluids and so forth. Accordingly, it may be desirable for the cement composition utilized for cementing pipe strings in the well bores to develop high strength after setting and to have sufficient resiliency (e.g., elasticity and ductility) to resist loss of the cement bond between the exterior surfaces of the pipe or the well bore walls, or both. Also, it may be desirable for the cement composition to be able to resist cracking and/or shattering that may result from other forces on the cement sheath. For example, it may be desirable for the cement sheath to include structural characteristics that protect its structural integrity from forces associated with formation shifting, overburden pressure, subsidence, tectonic creep, pipe movements, impacts and shocks subsequently generated by drilling and other well operations.

Another problem that may be encountered in well cementing methods is the undesired gas migration from the subterranean formation into and through the cement composition. Problems with gas migration may be encountered during setting of the cement composition as it transitions from a hydraulic fluid to a solid mass. Gas migration may cause undesired flow channels to form in the cement composition that may remain in the cement composition after it has set into a hardened mass, potentially resulting in loss of zonal isolation.

Yet another problem that may be encountered in well cementing methods is associated with exposure to corrosive fluids. Examples of corrosive environments include exposure to acidic conditions either caused by actual placement of acid solutions for well treatment or in the presence of carbon dioxide ($CO_2$). Carbon dioxide has been used for enhanced recovery methods by injecting $CO_2$ into a permeable reservoir in order to displace oil and gas towards a producing well. Carbon dioxide sequestration activities involve placing $CO_2$ into a reservoir for permanent storage. Upon exposure to water, the $CO_2$ may yield carbonic acid. In addition, the carbon dioxide may also convert exposed cement surfaces to calcium carbonate, a process commonly referred to as carbonation. Calcium carbonate being acid soluble may then slowly be dissolved by the carbonic acid. Dissolution of the calcium carbonate by the carbonic acid may be more severe in a cement sheath with a higher permeability due to more flow paths for the carbonic acid into the cement sheath. To counteract problems associated with exposure to corrosive fluids, additives may often be added to a cement composition to reduce the permeability of the cement sheath. For example, latex additives have been added to reduce permeability. Reducing the water content by optimized particle packing also may reduce the permeability of the cement sheath. Reduction of the permeability of the cement sheath generally may reduce flow paths for the acid, thus reducing the exposure of the cement sheath to potentially damaging acid.

SUMMARY

The present invention relates to well treatment fluids and methods utilizing nano-particles and, in certain embodiments, to well cement compositions and methods utilizing nano-clay.

An embodiment of a method of the present invention may comprise introducing a treatment fluid comprising nano-clay into a subterranean formation. The treatment fluid may be selected from the group consisting of a cement composition, a drilling fluid, a spacer fluid, and a lost circulation control composition.

Another embodiment of the present invention may comprise a method of cementing. The method of cementing may comprise introducing a cement composition comprising a hydraulic cement, nano-clay, and water into a subterranean formation. The method further may comprise allowing the cement composition to set in the subterranean formation.

Another embodiment of the present invention may comprise a composition for use in a subterranean formation. The composition may comprise a treatment fluid that comprises nano-clay. The treatment fluid may be selected from the group consisting of a cement composition, a drilling fluid, a spacer fluid, and a lost circulation control composition.

The features and advantages of the present invention will be apparent to those skilled in the art upon reading the following description of specific embodiments.

DESCRIPTION OF SPECIFIC EMBODIMENTS

The present invention relates to well treatment fluids and methods utilizing nano-particles and, in certain embodiments, to well cement compositions and methods utilizing nano-clay.

An embodiment of the cement compositions of the present invention may comprise hydraulic cement, nano-clay, and water. Those of ordinary skill in the art will appreciate that embodiments of the cement compositions generally should have a density suitable for a particular application. By way of example, the cement compositions may have a density in the range of from about 4 pounds per gallon ("ppg") to about 20 ppg. In certain embodiments, the cement compositions may have a density in the range of from about 8 ppg to about 17 ppg. Embodiments of the cement compositions may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density for a particular application.

Embodiments of the cement compositions of the present invention may comprise hydraulic cement. Any of a variety of hydraulic cements suitable for use in subterranean cementing operations may be used in accordance with embodiments of the present invention. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, and combinations thereof. In certain embodiments, the hydraulic cement may comprise a Portland cement. Portland cements that may be suited for use in embodiments of the present invention may be classified as Class A, C, H and G cements according to American Petroleum Institute, API Specification for Materials and Testing for Well Cements, API Specification 10, Fifth Ed., Jul. 1, 1990. In addition, in some embodiments, hydraulic cements suitable for use in the present invention may be classified as ASTM Type I, II, or III.

Nano-clay may also be present in embodiments of the cement compositions of the present invention. An example of a suitable nano-clay includes nano-bentonite. In one particular embodiment, the nano-clay may comprise nano-montmorillonite. Nano-montmorillonite is a member of the smectite-clay family, and belongs to the general mineral group of clays with a sheet-like structure where the dimensions in two directions far exceed its thickness. Generally, the nano-montmorillonite has of a three-layered structure of aluminum sandwiched between two layers of silicon, similar to the mica-type layered silicates. Montmorillonite is an active and major ingredient in a volcanic ash called bentonite, which has an ability to swell to many times its original weight and volume when it absorbs water. One example of a suitable nano-montmorillonite is NANOMER® nanoclay, which is available from Nanocor, Arlington Heights, Ill.

It is now recognized that the nano-clay utilized with present embodiments may have an impact on certain physical characteristics of resulting cements. For example, relative to inclusion of larger clay particles in a cement composition, inclusion of nano-clay in particular cement compositions may provide improved mechanical properties, such as compressive strength and tensile strength. In addition, the nano-clay also may be included in embodiments of the cement composition to reduce the permeability of the resultant set cement, thus potentially reducing the susceptibility of the set cement to problems associated with gas migration or corrosive environments such as those created by $CO_2$. For example, a cement composition may be designed to have reduced permeability after setting by including nano-clay in the cement composition. Accordingly, a cement composition in accordance with present embodiments may comprise a sufficient amount of nano-clay to provide the desired characteristics in a resulting set cement. By way of example, the nano-clay may be present in the cement composition in an amount in the range of from about 0.1% to about 25% by weight of the cement on a dry basis ("bwoc") (e.g., 0.5%, 1%, 5% bwoc, 10% bwoc, 15% bwoc, 20% bwoc, etc.). In certain embodiments, the nano-clay may be present in the cement composition in an amount in the range of from about 2% to about 10% bwoc.

The nano-clay may be provided in any suitable form, including as dry particles or as a colloid suspension. In one embodiment, the nano-clay may be provided and added to the cement composition as a dry nano-clay powder.

Generally, the nano-clay may be defined as nano-clay having a largest dimension (e.g., length, width, thickness, etc.) of less than about 1 micron. For example, the largest dimension of the nano-clay may be in the range of from about 1 nanometers ("nm") to about 1 micron (e.g., about 10 nm, about 50 nm, about 100 nm, about 200 nm, about 300 nm, about 400 nm, about 500 nm, about 600 nm, about 700 nm, about 800, about 900 nm, etc.) In certain embodiments, the largest dimension of the nano-clay may be in the range of from about 1 nm to about 100 nm. However, it should be noted that the nano-clay may be utilized in combination with differently sized clay particles in accordance with present embodiments. For example, a number of clay particles with particle sizes greater than 1 micron may be included in a cement composition in accordance with present embodiments.

The nano-clay may be configured in any of a variety of different shapes in accordance with embodiments of the present invention. Examples of suitable shapes include nano-clay in the general shape of platelets, shavings, flakes, rods, strips, spheroids, toroids, pellets, tablets, or any other suitable shape. In certain embodiments, the nano-clay may generally have a plate-type structure. Suitable plate-type nano-clays include nano-montmorillonite. Plate-type nano-clay may have a thickness, in certain embodiments of less than about 10 nm and, alternatively, of less than about 2 nm. In certain embodiments, the plate-type nano-clay may have a thickness of about 1 nm. Embodiments of the plate-type nano-clay may have surface dimensions (length and/or width) of about 1 nm to about 600 nm. In certain embodiments, the plate-type nano-clay may have surface dimensions about 300 nm to about 600 nm. It should be understood that plate-type nano-clay having dimensions outside the specific ranges listed in this disclosure are encompassed by the present invention.

The water used in embodiments of the cement compositions of the present invention may be freshwater or saltwater (e.g., water containing one or more salts dissolved therein, seawater, brines, saturated saltwater, etc.). In general, the water may be present in an amount sufficient to form a pumpable slurry. By way of example, the water may be present in the cement compositions in an amount in the range of from about 33% to about 200% bwoc. In certain embodiments, the water may be present in an amount in the range of from about 35% to about 70% bwoc.

Other additives suitable for use in subterranean cementing operations also may be added to embodiments of the cement compositions, in accordance with embodiments of the present invention. Examples of such additives include, but are not limited to, strength-retrogression additives, set accelerators, set retarders, weighting agents, lightweight additives, gas-generating additives, mechanical property enhancing additives, lost-circulation materials, filtration-control additives, dispersants, a fluid loss control additive, defoaming agents, foaming agents, thixotropic additives, and combinations thereof. By way of example, the cement composition may be a foamed cement composition further comprising a foaming agent and a gas. Specific examples of these, and other, additives include crystalline silica, amorphous silica, fumed silica, salts, fibers, hydratable clays, calcined shale, vitrified shale, microspheres, fly ash, slag, diatomaceous earth, metakaolin, rice husk ash, natural pozzolan, zeolite, cement kiln dust, lime, elastomers, resins, latex, combinations thereof, and the like. A person having ordinary skill in the art, with the benefit of this disclosure, will readily be able to determine the type and amount of additive useful for a particular application and desired result.

As will be appreciated by those of ordinary skill in the art, embodiments of the cement compositions of the present invention may be used in a variety of subterranean applications, including primary and remedial cementing. For example, a cement composition comprising cement, a nano-clay, and water may be introduced into a subterranean formation and allowed to set therein. In certain embodiments, for example, the cement composition may be introduced into a space between a subterranean formation and a pipe string located in the subterranean formation. Embodiments may further comprise running the pipe string into a well bore penetrating the subterranean formation. The cement composition may be allowed to set to form a hardened mass in the space between the subterranean formation and the pipe string. In addition, a cement composition may be used, for example, in squeeze-cementing operations or in the placement of cement plugs. Embodiments of the present invention further may comprise producing one or more hydrocarbons (e.g., oil, gas, etc.) from a well bore penetrating the subterranean formation.

While the preceding discussion is directed to the use of nano-clay, those of ordinary skill in the art will also appreciate that it may be desirable to utilize other types of nano-particles, in accordance with embodiments of the present invention. Examples of such nano-particles include nano-hydraulic cement, nano-silica, nano-alumina, nano-zinc oxide, nano-boron, nano-iron oxide and combinations thereof. In certain embodiments, the nano-particles may be particulate in nature and not, for example, a colloidal nano-particle or a suspension of the nano-particle in solution. Furthermore, while the preceding discussion is directed to the use of nano-particles (e.g., nano-clay) in well cementing methods, those of ordinary skill in the art will appreciate that the present technique also encompasses the use of nano-particles in any of a variety of different subterranean treatments. For example, the nano-particles may be included in any of a number of well treatment fluids that may be used in subterranean treatments, including drilling fluids, spacer fluids, and lost circulation control fluids. In certain embodiments, a drilling fluid comprising a nano-particle may be circulated in a well bore while drilling of the well bore is in progress. In other embodiments, the nano-particles may be included in a spacer fluid that may be introduced into a subterranean formation to at least partially displace a first fluid from a well bore. The spacer fluid generally may also separate the first fluid from a second fluid that is introduced into the subterranean formation. In lost circulation embodiments, for example, a pill or plug comprising a nano-particle may be introduced into a well bore and allowed to circulate through the well bore at least to the zone needing lost circulation treatment or to the zone where lost circulation is believed to likely occur.

In addition to the use of the nano-particles without encapsulation, embodiments of the present invention may include encapsulation of the nano-particles to facilitate transportation and incorporation of the nano-particles in well treatment fluids (e.g., cement compositions). Specifically, encapsulation of the nano-particles in accordance with present embodiments may include enclosing the nano-particles within an outer coating or container in particulate form. Example methods of encapsulation are set forth in U.S. Pat. Nos. 5,373,901; 6,444,316; 6,527,051; 6,554,071; 7,156,174; and 7,204,312, the disclosures of which are incorporated herein by reference.

Various types of encapsulation may be employed such that the nano-particles (e.g., nano-clay) may be contained but retain their corresponding impact on physical properties of cement slurries. For example, the nano-particles may be encapsulated within a bag, capsule, layer, coating or the like. Further, the material utilized to encapsulate the nano-particles may be selected to facilitate transportation and/or incorporation of the nano-particles into a well treatment fluid. For example, to facilitate handling of the nano-particles and/or to facilitate timed release of the nano-particles, the encapsulation material may be degradable. This may facilitate handling of the nano-particles by allowing inclusion of the encapsulated nano-particles in a well treatment fluid without requiring that the nano-particles first be removed from the encapsulating material. Further, the encapsulating material may be designed to degrade at a certain rate when in contact with certain materials (e.g., water) so that the nano-particles are released into the well treatment fluid at a desired time. Example water-dissolvable materials that may be utilized to encapsulate the nano-particles are described in U.S. Pat. Nos. 4,961,790 and 5,783,541, the disclosures of which are incorporated herein by reference.

In accordance with embodiments of the present invention, a cement composition comprising cement, a nano-particle (e.g., nano-clay), and water may utilize a packing volume fraction suitable for a particular application as desired. As used herein, the term "packing volume fraction" refers to the volume of the particulate materials in a fluid divided by the total volume of the fluid. The size ranges of the preferred particulate materials are selected, as well as their respective proportions, in order to provide a maximized packing volume fraction so that the fluid is in a hindered settling state. It is known that, in such a state, the particulate materials behave "collectively" like a porous solid material. The hindered settling state is believed to correspond, in practice, to a much higher solid material concentration in the fluid than that present in the some traditional cement compositions.

The present embodiments may include a combination of at least three features to obtain a maximum packing volume fraction. One is the use of at least three particulate materials wherein the at least three particulate materials are in size ranges "disjointed" from one another. In some embodiments, each of the three particulate materials may include a different particle size selected from the following ranges: about 7 nm to about 50 nm, about 0.05 microns to about 0.5 microns, 0.5 microns to about 10 microns, about 10 microns to about 20 microns, about 20 microns to about 200 microns, about 200 microns to about 800 microns, and greater than about 1 millimeter. For example, a first particulate material may include particles sized from about 7 nm to about 50 nm, a second particulate material may include particles sized from about 0.05 microns to about 0.5 microns, and a third particulate material may include particles sized from about 10 microns to about 20 microns. In accordance with present embodiments, the first particulate material may include nano-clay, nano-hydraulic cement, nano-silica, nano-alumina, nano-zinc oxide, nano-boron, nano-iron oxide, or a combination thereof. Another feature of present embodiments may include a choice of the proportions of the three particulate materials in relation to the mixing, such that the fluid, when mixed, is in a hindered settling state. Another feature may include the choice of the proportions of the three particulate materials between each other, and according to their respective size ranges, such that the maximum packing volume fraction is at least substantially achieved for the sum total of all particulate materials in the fluid system. Packing volume fraction is described in further detail in U.S. Pat. Nos. 5,518,996 and 7,213,646, the disclosures of which are incorporated herein by reference.

To facilitate a better understanding of the present technique, the following examples of some specific embodiments are given. In no way should the following examples be read to limit, or to define, the scope of the invention.

Example 1

The following series of tests were performed to determine the compressive strength of cement compositions that comprised nano-clay. The sample cement compositions prepared for this test comprised Class A Portland cement, clay, and water. The clay included in each sample cement composition was either nano-bentonite or bentonite having a particle size of about 32-38 microns. The nano-bentonite was provided by Nanacor, Inc. As indicated in the table below, the amount of clay in each sample cement composition was varied from 0.5% bwoc to 8% bwoc. In one sample, the nano-clay was replaced by nano-silica. After preparation, the sample cement compositions were cured at 120° F. for 24 hours. The 24-hour and 14-day compressive strengths were then determined in accordance with API Recommended Practice 10B-2, First Edition, July 2005. The results of these tests are set forth in Table 1 below.

TABLE 1

| Sample | Density (ppg) | 24-Hour Compressive Strength (psi) | 14-Day Compressive Strength (psi) |
| --- | --- | --- | --- |
| 0.5% Nano-Bentonite | 15.68 | 2880 | — |
| 0.5% Bentonite | 15.68 | 2870 | — |
| 1% Nano-Bentonite | 15.44 | 2800 | — |

TABLE 1-continued

| Sample | Density (ppg) | 24-Hour Compressive Strength (psi) | 14-Day Compressive Strength (psi) |
| --- | --- | --- | --- |
| 1% Bentonite | 15.44 | 2680 | — |
| 2% Nano-Bentonite | 14.7 | 1853 | 2090 |
| 2% Bentonite | 14.7 | 1746 | 2770 |
| 4% Nano-Bentonite | 14.1 | 1502 | 1929 |
| 4% Bentonite | 14.1 | 1472 | 1843 |
| 6% Nano-Bentonite | 13.5 | 780 | 1517 |
| 6% Bentonite | 13.5 | 801 | 1598 |
| 8% Nano-Bentonite | 13.1 | 559 | 1061 |
| 8% Bentonite | 13.1 | 641 | 1129 |
| 2% Nano-Bentonite/ 2% Nano-Silica | 14.7 | 1771 | — |
| 2% Bentonite/ 2% Nano-Silica | 14.7 | 2410 | — |

Example 2

The following series of tests were performed to determine the water permeability for cement compositions that comprised nano-clay. The sample cement compositions prepared for this test comprised Class A Portland cement, clay, and water. The clay included in each sample cement composition was either nano-bentonite or bentonite having a particle size of about 32-38 microns. The nano-bentonite was provided by Nanocor, Inc. As indicated in the table below, the amount of clay in each sample composition was varied from 0.5% bwoc to 8% bwoc. In one sample, the nano-clay was replaced by nano-silica. After preparation, the sample cement compositions were cured at 120° F. for 24 hours. The average permeability of each composition was determined in accordance with API Recommended Practice 10 RP 10B-2/ISO 10426-2, First Edition, July 2005, Procedure 11 (Permeability Tests). The results of these tests are set forth in Table 2 below.

TABLE 2

| Sample | Density (ppg) | Average Permeability (md) | Permeability Reduction (%) |
| --- | --- | --- | --- |
| 0.5% Nano-Bentonite | 15.68 | 0.004223 | 80.8 |
| 0.5% Bentonite | 15.68 | 0.022018 | |
| 1% Nano-Bentonite | 15.44 | 0.00089 | 38.6 |
| 1% Bentonite | 15.44 | 0.00145 | |
| 2% Nano-Bentonite | 14.7 | 0.006165 | 32.4 |
| 2% Bentonite | 14.7 | 0.009125 | |
| 4% Nano-Bentonite | 14.1 | 0.005845 | 47.1 |
| 4% Bentonite | 14.1 | 0.011043 | |
| 6% Nano-Bentonite | 13.5 | 0.21575 | 65.6 |
| 6% Bentonite | 13.5 | 0.062725 | |
| 8% Nano-Bentonite | 13.1 | 0.052272 | 46.7 |
| 8% Bentonite | 13.1 | 0.098023 | |
| 2% Nano-Bentonite/ 2% Nano-Silica | 14.7 | 0.00561 | 28.9 |
| 2% Bentonite/ 2% Nano-Silica | 14.7 | 0.00789 | |

As indicated by the preceding table, a significant decrease in permeability was observed for cement compositions that comprised the nano-bentonite as compared with regular bentonite. The permeability reduction was calculated and is reported as the difference between the nano-bentonite permeability and the bentonite permeability divided by the bentonite permeability. As indicated by the preceding table, the permeability reduction ranged from about 29% to about 80%. This indicates, for example, that cement compositions comprising the nano-bentonite should be less susceptible to gas migration or the penetration of corrosive fluids such as those containing $CO_2$.

Example 3

The following series of tests were performed to determine additional mechanical properties for cement compositions that comprised nano-clay. The sample cement compositions prepared for this test comprised Class A Portland cement, clay, and water. The clay included in each sample cement composition was either nano-bentonite or bentonite having a particle size of about 32-38 microns. The nano-bentonite was provided by Nanacor, Inc. As indicated in the table below, the amount of clay in each sample composition was 5% bwoc. After preparation, the sample cement compositions were cured at 120° F. for 72 hours. The 72-hour compressive strength was then determined in accordance with API Recommended Practice 10B-2, First Edition, July 2005. The Young's Modulus and Poisson's ratio were determined using ASTM D3148-02. The tensile strength was determined in accordance with ASTM C190. The results of these tests are set forth in Table 3 below.

TABLE 3

| Sample | Density (ppg) | 72-Hour Compressive Strength (psi) | Young's Modulus | Poisson's Ratio | Tensile Strength (psi) |
|---|---|---|---|---|---|
| 5% Nano-Bentonite | 13.8 | 1708.5 | 6.09E+05 | 0.177 | 252 |
| 5% Bentonite | 13.8 | 1073.5 | 5.49E+05 | 0.165 | 154 |

As indicated by the preceding table, cement compositions that comprised nano-bentonite were observed to have superior mechanical properties as compared with regular bentonite, as shown by the higher compressive strength and tensile strength. Accordingly, set cement compositions with nano-bentonite may be less susceptible to break down under load, suggesting that a cement sheath containing nano-clay may be less susceptible to failure.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of cementing comprising:
   providing a hydraulic cement,
   providing a non-colloidal nano-clay,
   preparing a cement composition that is latex free and comprises the hydraulic cement, the non-colloidal nano-clay, and water; wherein the non-colloidal nano-clay has a length, the length being in a range of from about 1 nanometer to about 600 nanometers, and wherein the non-colloidal nano-clay is present in an amount in a range of from about 0.1% to about 25% by weight of the hydraulic cement on a dry basis;
   introducing the cement composition into a subterranean formation; and
   allowing the cement composition to set in the subterranean formation to form a hardened cement that prevents migration of fluids.

2. The method of claim 1 wherein the cement composition is allowed to set in a space between a pipe string and the subterranean formation.

3. The method of claim 2 further comprising running the pipe string into a well bore penetrating the subterranean formation.

4. The method of claim 1 wherein the cement composition has a density of about 4 pounds per gallon to about 20 pounds per gallon.

5. The method of claim 1 wherein the hydraulic cement comprises at least one cement selected from the group consisting of Portland cement, pozzolana cement, gypsum cement, high-alumina-content cement, slag cement, silica cement, and any combination thereof.

6. The method of claim 1 wherein the non-colloidal nano-clay comprises nano-bentonite.

7. The method of claim 1 wherein the length of the non-colloidal nano-clay is in the range of from about 1 nanometer to about 400 nanometers.

8. The method of claim 1 wherein the non-colloidal nano-clay has a general plate-type structure with a thickness of less than about 10 nanometers.

9. The method of claim 1 wherein the non-colloidal nano-clay is present in the cement composition in an amount sufficient to reduce permeability of the set cement composition.

10. The method of claim 1 wherein the non-colloidal nano-clay is present in the cement composition in an amount of about 2% to about 10% by weight of the hydraulic cement on a dry basis.

11. The method of claim 1 wherein the non-colloidal nano-clay comprises plate-type nano-montmorillonite having a thickness of less than about 2 nanometers, the length being in the range of about 300 nanometers to about 600 nanometers.

12. The method of claim 1 wherein the cement composition further comprises at least one nano-particle selected from the group consisting of nano-hydraulic cement, nano-silica, nano-alumina, nano-zinc oxide, nano-boron, nano-iron oxide, and any combination thereof.

13. The method of claim 1 wherein the cement composition further comprises at least one additive selected from the group consisting of a strength-retrogression additive, a set accelerator, a set retarder, a weighting agent, a lightweight additive, a gas-generating additive, a mechanical property enhancing additive, a lost-circulation material, a filtration-control additive, a fluid loss control additive, a dispersant, a defoaming agent, a foaming agent, a thixotropic additive, and any combination thereof.

14. The method of claim 1 wherein the cement composition further comprises at least one additive selected from the group consisting of crystalline silica, amorphous silica, fumed silica, a salt, fiber, a hydratable clay, calcined shale, vitrified shale, a microsphere, fly ash, slag, diatomaceous earth, metakaolin, rice husk ash, natural pozzolan, zeolite, cement kiln dust, lime, an elastomer, a resin, and any combination thereof.

15. The method of claim 1 further comprising maximizing a packing volume fraction in the cement composition using particulate material including the non-colloidal nano-clay.

16. The method of claim 1 further comprising including the non-colloidal nano-clay in the cement composition while the non-colloidal nano-clay is encapsulated in a degradable material.

17. A method comprising:
introducing a treatment fluid into a subterranean formation, wherein the treatment fluid is latex free and comprises a non-colloidal nano-clay, wherein the non-colloidal nano-clay has a length, the length being in a range of from about 1 nanometer to about 600 nanometers, and wherein the treatment fluid is selected from the group consisting of a cement composition, a drilling fluid, a spacer fluid, and a lost circulation control composition, wherein the cement composition sets to form a hardened cement that prevents migration of fluids, wherein the treatment fluid comprises hydraulic cement, and wherein the non-colloidal nano-clay is present in an amount in a range of from about 0.1% to about 25% by weight of the hydraulic cement on a dry basis.

18. The method of claim 17 wherein the treatment fluid is introduced into the subterranean formation to at least partially displace a first fluid from a well bore, and wherein the treatment fluid separates the first fluid from a second fluid that is introduced into the subterranean formation.

19. The method of claim 17 wherein the treatment fluid is introduced into the subterranean formation while drilling a well bore in the subterranean formation.

20. The method of claim 17 wherein the non-colloidal nano-clay comprises nano-bentonite.

21. The method of claim 17 wherein the length of the non-colloidal nano-clay is in the range of from about 1 nanometer to about 400 nanometers.

22. The method of claim 17 wherein the non-colloidal nano-clay has a general plate-type structure with a thickness of less than about 10 nanometers.

23. The method of claim 17 wherein the non-colloidal nano-clay comprises plate-type nano-montmorillonite having a thickness of less than about 2 nanometers, the length being in the range of about 300 nanometers to about 600 nanometers.

24. The method of claim 17 wherein the treatment fluid further comprises at least one nano-particle selected from the group consisting of nano-hydraulic cement, nano-silica, nano-alumina, nano-zinc oxide, nano-boron, nano-iron oxide, and any combination thereof.

25. A method of cementing comprising:
providing a hydraulic cement,
providing a non-colloidal nano-clay,
preparing a cement composition that is latex free and comprises hydraulic cement, the non-colloidal nano-clay, and water; wherein the non-colloidal nano-clay comprises plate-type nano-clay having a thickness of less than about 10 nanometers, wherein the nano-clay is present in an amount in a range of from about 0.1% to about 25% by weight of the hydraulic cement on a dry basis;
introducing the cement composition into a subterranean formation; and
allowing the cement composition to set in the subterranean formation to form a hardened cement that prevents fluid flow.

26. The method of claim 25 wherein the cement composition is allowed to set in a space between a pipe string and the subterranean formation.

27. The method of claim 26 further comprising running the pipe string into a well bore penetrating the subterranean formation.

28. The method of claim 25 wherein the cement composition has a density of about 4 pounds per gallon to about 20 pounds per gallon.

29. The method of claim 25 wherein the hydraulic cement comprises at least one cement selected from the group consisting of Portland cement, pozzolana cement, gypsum cement, high-alumina-content cement, slag cement, silica cement, and any combination thereof.

30. The method of claim 25 wherein the plate-type nano-clay comprises nano-bentonite.

31. The method of claim 25 wherein the plate-type nano-clay has a length in the range of from about 1 nanometer to about 400 nanometers.

32. The method of claim 25 wherein the plate-type nano-clay has a length in the range of about 1 nanometer to about 600 nanometers.

33. The method of claim 25 wherein the non-colloidal nano-clay is present in the cement composition in an amount sufficient to reduce permeability of the set cement composition.

34. The method of claim 25 wherein the non-colloidal nano-clay is present in the cement composition in an amount of about 2% to about 10% by weight of the hydraulic cement on a dry basis.

35. The method of claim 25 wherein the plate-type nano-clay has a thickness of less than about 2 nanometers and a length in the range of about 300 nanometers to about 600 nanometers.

36. The method of claim 25 wherein the cement composition further comprises at least one nano-particle selected from the group consisting of nano-hydraulic cement, nano-silica, nano-alumina, nano-zinc oxide, nano-boron, nano-iron oxide, and any combination thereof.

37. The method of claim 25 wherein the cement composition further comprises at least one additive selected from the group consisting of a strength-retrogression additive, a set accelerator, a set retarder, a weighting agent, a lightweight additive, a gas-generating additive, a mechanical property enhancing additive, a lost-circulation material, a filtration-control additive, a fluid loss control additive, a dispersant, a defoaming agent, a foaming agent, a thixotropic additive, crystalline silica, amorphous silica, fumed silica, a salt, fiber, a hydratable clay, calcined shale, vitrified shale, a microsphere, fly ash, slag, diatomaceous earth, metakaolin, rice husk ash, natural pozzolan, zeolite, cement kiln dust, lime, an elastomer, a resin, and any combination thereof.

* * * * *